Sept. 23, 1941.     B. W. MANTLE     2,256,564
SPRING EXPANDER
Filed July 19, 1939
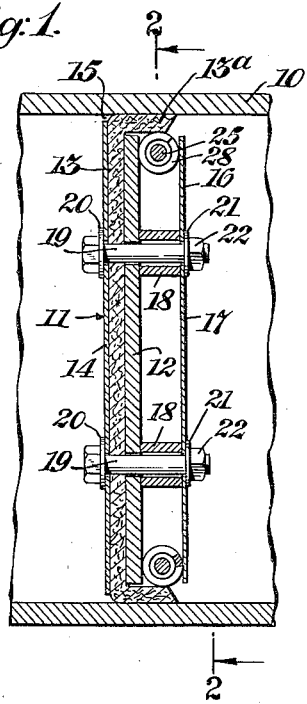
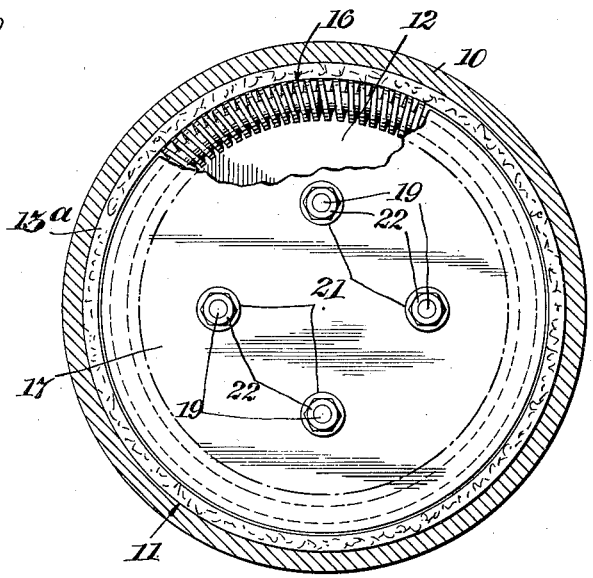
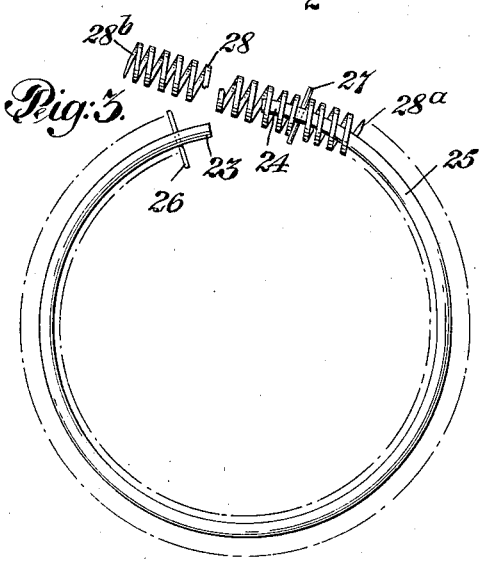
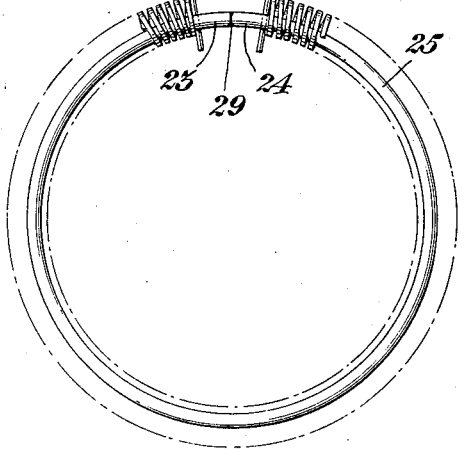
INVENTOR
BURR WARD MANTLE
BY
Van Deventer + Grier
ATTORNEYS Patented Sept. 23, 1941

2,256,564

UNITED STATES PATENT OFFICE 2,256,564

SPRING EXPANDER

Burr Ward Mantle, Pittsford, N. Y., assignor to The American Brake Shoe & Foundry Company, a corporation of Delaware Application July 19, 1939, Serial No. 285,462

1 Claim. (Cl. 309—34)

This invention relates to improvements in spring expanders, and has for an object the provision of a self-contained spring expander unit adapted to exert uniform radial pressures at all points about its circumference.

Another object of the invention is the provision in a spring expander exerting uniform radial pressures thereabout, of a solid circular member within the convolutions which functions (a) to maintain the spring of the expander in toroidal form from the time it is manufactured to the time it is installed in a device; (b) to limit the movement of the convolutions of the spring toward the cylinder wall surface where the device is employed in a cylinder, or toward the rod surface where the device is installed in connection with piston rods or the like for the purpose of preventing the surfaces of the cylinder or the rod from becoming scored when the packing wears out. For example, where the device is installed in a leather cupped type of piston, it exerts uniform radial pressure against the interior of the leather cup for effecting a positive seal with the cylinder wall and automatically adjusts itself as the leather wears away. However, before the time the leather gets so thin that the convolutions of the spring can score the cylinder, the solid circular member prevents further expansion of the expander unit.

A further object of the invention is the provision of a novel method of making spring expanders in which a ring is almost completely formed of a piece of solid stock, the ends of the stock remaining spaced apart from each other a sufficient distance to enable the operator to "screw the spring on." Cross holes are provided in the ring spaced apart from the ends thereof to enable the ends to be welded together when the spring is on the ring. Rods are positioned in the holes and when the spring is screwed on, it is confined in a continuous portion of the ring between the rods. The ends of the ring are brought into abutment with each other and are welded, after which the pins are moved and the ends of the spring engage each other, as will be more clearly described in connection with the drawing.

Other objects and advantages of the invention will be apparent to those skilled in the art.

Referring to the accompanying drawing:

Figure 1 is a cross sectional view of a piston equipped with one embodiment of the invention;

Figure 2 is an elevation taken along the line 2—2 of Figure 1; and

Figures 3 and 4 are views showing steps employed in making the device.

In Figure 1, a cylinder 10 is provided with a piston generally designated by the numeral 11 and comprised of a heavy circular plate 12 which fits in the cup of a cupped washer 13. A backing plate 14 contacts the outside of the cupped leather in parallel relation to the plate 12, the plate 14 being of such diameter that an annular clearance space 15 is provided between its edge and the wall of the cylinder. The annular edge or flange 13a of the cup-shaped washer contacts the interior wall of the cylinder 10. The spring expander, generally designated by the numeral 16 engages the inner surface of the flange 13a and forces the material of the flange radially against the inner wall of the cylinder 10 at all points about its circumference.

A retaining plate 17 is provided for retaining the spring expander in cooperative relation with the flange 13a. Spacer bushings 18 hold the retaining plate 17 a predetermined distance from the plate 12 so as to retain the spring expander in its proper position without restricting its action. Bolts 19 provided with washers 20 and 21 extend through the plate 14, the cupped washer 13, the plate 12, the spacer bushings 18 and the retaining plate 17, and nuts 22 are provided for securing the parts together.

Although no piston rod is shown associated with the piston 11, other modifications contemplate arrangements in which a piston rod is associated with the piston 11, and still other modifications contemplate arrangements where a cupped leather washer embraces a piston rod or the like, in which event the spring expander exerts radial pressure inwardly in order to firmly hold the cupped washer in sealed relation with the surface of the piston rod.

It must also be understood that although the embodiment herein illustrated by way of example, shows the use of the spring expander in connection with cupped leather washers, I reserve the right to use the spring expander with other types of pistons in which other materials than cupped leather washers are employed in contact with the cylinder walls or other surfaces to be sealed.

In making the new and improved spring expander, a rod 25 is formed circularly, thereby providing a ring having ends 23 and 24 open and spaced apart from each other a sufficient distance to permit the spring to be placed upon the rod as will presently be described.

Spaced apart from the end 23 is a pin 26 mounted in a hole (not shown) in the rod 25. Spaced apart from the end 24 is a second pin indicated by the numeral 27. A spring 28 of the proper length is formed in the usual manner and is screwed on to one end of the ring; for example in Figure 3, it is illustrated as being applied over the end 24 by rotating the spring in the direction to screw it on. It passes over the pin 27 and as the operation progresses the end 28a of the spring comes to rest against the pin 26 and a few more turns will bring the end 28b of the spring beyond the pin 27 so that the ends 23 and 24 which are held free of the spring by means of the pins 26 and 27 may be brought into abutment with each other as shown in Figure 4 and the ends welded together as indicated at 29 in Figure 4.

If desired, the pin 27 may be omitted and the spring 28 may be pushed on to the ring until its end 28a contacts the pin 26. Then the pin 27 may be inserted in its hole and the spring turned for a few revolutions to bring the end 28b behind the pin 27.

After the welding has been completed, the pins 26 and 27 are withdrawn from the holes in the rod 25, thereby permitting the ends 28a and 28b of the spring to abut each other, and a complete self-contained spring expander is formed.

From the foregoing it can be seen that my method of forming a solid open ring, providing a way to apply the spring to the ring in such a manner as to leave the ends free to be brought together and welded, and permitting the ends of the spring to abut after the welding has been effected, is new and novel and permits the manufacture of self-contained spring expanders in quantity production. Spring expanders made in this manner have the distinct advantage in that all of the convolutions of the spring exert substantially the same radial pressure throughout the circle, there being no spiders attached to the ring and tending to divide the spring up into zones of varying pressures. The presence of the ring within the spring provides a spring expander unit which may be easily handled, shipped and installed.

Although the spring illustrated in the drawing is formed of square wire, I do not wish to limit myself to the use of square wire, as wire of any other cross section may be used. The square wire is believed to be preferable, especially in large units, because it will not sink into the leather or other flexible packing means as deeply as would a round or other form of wire. The cross section of the material of which the ring 25 is made should be sufficient to prevent the coil of spring from bending or distorting the ring once it is assembled into its place of use. The diameter of the ring should be such that when the packing material wears very thin the convolutions of the spring will be prevented from scoring the surfaces of the cylinder walls in cases where the device is applied to a piston or the piston rod in cases where the expander device is arranged to exert its force radially toward the center of the circle.

In cases where the spaces between the convolutions of the spring are so narrow that a continuous spring cannot be compressed between the stops on the ring, it may be advantageous to make the spring of a plurality of shorter lengths and intersperse the ends of the springs with each other so as to get them between the stops. After the welding process has been completed and the stop pins removed, the springs may then be screwed apart to form a continuous spring means circumferentially embracing the ring.

Many changes may be made in the embodiment herein shown and described without departing from the spirit of the invention as set forth in the annexed claim; for example, instead of using a continuous circular ring, the ring might be semi-circular and have its ends terminate in a flat surface. The ends of the semi-circular ring might be of reduced diameter and threaded so that nuts could be applied to secure the half ring to the flat surface, in which event, the spring carried on the bar would present a semi-circular engaging surface to the packing means.

Other arrangements contemplate making the expander of segmental form having the segments of either greater or less than 180° span.

What is claimed is:

A spring expander unit for urging a flexible sealing medium into intimate contact with the circular wall with which a seal is to be effected, said unit being comprised of a continuous helical spring means, and a rigid ring entirely embraced by said helical spring means and formed of rod or bar material having a sectional width greater than the width of the spaces between the convolutions of said spring, said ring being of a diameter to prevent said spring means from expanding to the full internal diameter of said circular wall, thereby permitting maximum wear of the sealing medium without scoring said wall.

BURR WARD MANTLE.